(12) United States Patent  
Robinson (10) Patent No.: US 6,385,918 B1
(45) Date of Patent: May 14, 2002

(54) ENERGY ABSORBER (75) Inventor: William Henry Robinson, Eastbourne (NZ)

(73) Assignee: Robinson Seismic Limited, Wellington (NZ)

( * ) Notice: Subject to any disclaimer, the term of this patent is extended or adjusted under 35 U.S.C. 154(b) by 0 days.

(21) Appl. No.: 09/462,093

(22) PCT Filed: Jul. 13, 1998

(86) PCT No.: PCT/NZ98/00100

§ 371 Date: Mar. 13, 2000

§ 102(e) Date: Mar. 13, 2000

(87) PCT Pub. No.: WO99/02887

PCT Pub. Date: Jan. 21, 1999

(30) Foreign Application Priority Data

Jul. 11, 1997 (NZ) .................................................. 328319

(51) Int. Cl.⁷ ................................................. E04B 1/98
(52) U.S. Cl. ....................... 52/167.8; 52/167.7; 384/36; 267/140.2
(58) Field of Search ............................. 52/167.1, 167.4, 52/167.7, 167.8; 411/366.1, 437, 527

(56) References Cited

U.S. PATENT DOCUMENTS

| 4,117,637 A | 10/1978 | Robinson |
| 4,499,694 A | 2/1985 | Buckle et al. |
| 4,593,502 A | 6/1986 | Buckle |
| 4,713,917 A | 12/1987 | Buckle et al. |
| 5,201,155 A | 4/1993 | Shimoda et al. ............... 52/167 |
| 5,215,382 A | 6/1993 | Kemeny ....................... 384/36 |
| 5,597,240 A * | 1/1997 | Fyfe ............................. 384/36 |
| 5,655,756 A * | 8/1997 | Robinson ................. 267/140.2 |
| 5,761,856 A * | 6/1998 | Kishizono et al. ......... 52/167.8 |
| 5,765,322 A * | 6/1998 | Kubo et al. ................. 52/167.7 |
| 5,797,228 A * | 8/1998 | Kenemy ................... 52/167.7 |
| 5,904,010 A * | 5/1999 | Javid ......................... 52/167.7 |

FOREIGN PATENT DOCUMENTS

| AU | 261981 | 5/1963 |
| DE | 951195 | 10/1956 |
| DE | 2817953 | 8/1979 |
| DE | 3039035 | 4/1982 |
| WO | WO94/13974 | 6/1994 |
| WO | WO97/06372 | 2/1997 |
| ZA | 78/0706 | 2/1978 |

OTHER PUBLICATIONS

Patent Abstracts of Japan, vol. 13, No. 593, Dec. 27, 1989 & JP01250546A (Sumitomo Constr. Co. Ltd). Oct. 5, 1989.

* cited by examiner

Primary Examiner—Carl D. Friedman
Assistant Examiner—Steve Varner
(74) Attorney, Agent, or Firm—Jacobson Holman, PLLC

(57) ABSTRACT

An energy absorbing bearing with a primary application in the seismic isolation of structure from the ground or parts of other structures. It may also be used to dampen other forces on structures on which it is installed. The bearing consists of end plates separated by a laminate of resilient and stiffening layers. There is a plastically deformable insert within the laminate. The laminate interfaces with the end plates in each bearing and is secured near the central axis from end plate to end plate, but not near the peripheries. The advantage provided is allowing a wider range of forces to be absorbed than with known bearings of this type.

12 Claims, 9 Drawing Sheets

ENERGY ABSORBER

TECHNICAL FIELD

This invention relates to energy absorbers. More particularly it relates to seismic isolation bearings able to provide isolation from and to absorb energy imparted by outside forces of a wide range of magnitudes.

BACKGROUND ART

Lead rubber bearings and rubber bearings known in the art are described in WO 94/13974; U.S. Pat. No. 4,177,637; U.S. Pat. No. 4,499,694; U.S. Pat. No. 4,593,502; and U.S. Pat. No. 4,713,917. Such bearings have been primarily used in seismic isolation of structures. Seismic isolation involves increasing the natural period of a structure to outside the period of the exciting motion. This reduces the forces transmitted into a structure through decoupling. The addition of an improved damping mechanism to dissipate the associated energy, thereby controlling the displacements and further reducing the accelerations transmitted to a structure establishes a seismic protection system.

Bearings used in the seismic isolation of structures to date have each been designed to absorb external forces of a narrow range of magnitudes. It would be desirable to have a bearing with the ability to absorb forces of a wide range of magnitudes to provide both isolation for small displacements and good damping for large displacements.

It is an object of this invention to go some way towards achieving this desideratum or at least to offer the public a useful choice.

DISCLOSURE OF INVENTION

Accordingly, the invention may be said broadly to consist in an energy absorbing bearing comprising:

a pair of end plates, a substantially integral laminate comprising alternating layers of resilient material and stiffening members interposed between said end plates, each said end plate being connected to said laminate at or adjacent to a central axis running from one end plate through said laminate to the other end plate, but not otherwise, the unconnected adjacent surface portions of said laminate being capable of limited movement relative to each said end plate when said bearing is being acted upon by an external force.

In one embodiment there is provided an insert of plastically deformable material along said central axis extending substantially from one said end plate to the other side end plate.

In another embodiment said laminate is continuous from side to side and end to end without an insert.

In another alternative there is an empty core along said central axis extending substantially from one said plate to the other said plate.

In another alternative there are provided a plurality of inserts within said laminate.

Preferably said bearing has a regular cross-section.

In one embodiment the cross-section of said end plates and laminate is square.

In another embodiment the cross-section of said end plates and laminate is circular.

Preferably the cross-section of said insert is circular.

Alternatively the cross-section of said insert is square.

Preferably said stiffening members comprise rigid plates.

Preferably said rigid plates are of plastically deformable material.

More preferably said rigid plates have some elasticity as well as being of plastically deformable material.

Preferably, when said insert is present, it is compressed at a hydrostatic pressure at least approaching the shear yield stress of said plastically deformable material.

Preferably said insert material is lead.

Alternatively said insert material is high purity aluminum, tin, zinc, indium or iron, or alloys of lead, aluminium, tin, zinc, indium or iron or any superplastic alloy or other material having a low rate of work hardening.

In still a further alternative said insert material is densely packed granular material such as is described in U.S. Pat. No. 4,713,917.

In one embodiment said granular material is steel, glass beads, alumina, silicon carbide or any other similar hard granular material.

Alternatively said granular material is granular iron, lead, aluminium or other similar less hard material.

Alternatively said insert has a square cross-section.

Alternatively said insert is of variable geometric cross-section.

Preferably said insert has an hour glass shape when viewed in side elevation.

Preferably said insert has a regular geometric cross-section.

Preferably said resilient material is rubber.

Preferably said end plates are made of steel.

Alternatively said end plates are made of aluminium or aluminium alloy.

Alternatively said end plates are of ceramic material, fibreglass or other suitable material.

Preferably said end plates are adapted to have some flexibility in the direction along said central axis.

Preferably said laminate has steel plates as stiffening members, there being provided fixing means for fixing each stiffening plate at an end of said laminate to its adjacent end plate. Preferably a said insert is present in said bearing and each said fixing means abuts an end of said insert.

In another embodiment the invention is a method of isolating a structure from seismic forces acting upon it which comprises:

providing a seismic isolating bearing having a pair of end plates and a laminate of alternating layers of elastomer and stiffening material between said end plates, the end plates being secured to the top and bottom of said laminate only in the area adjacent a central axis passing through said end plates and said laminate, resting said structure on one said end plate and resting the other said end plate on the ground or another structure, and where necessary, securing said structure to one said end plate and securing the other said end plate to the ground or to another structure.

Preferably said seismic isolating bearing is as defined above.

In another embodiment the invention may be said broadly to consist in a laminate for use between a pair of end plates in a seismic isolating bearing comprising:

an outer laminate zone having alternating layers of elastomer and stiffening members, the planes of each said layer being, in use, substantially parallel to each other and to said pair of end plates, a bore extending substantially through said laminate having a central axis orthogonal to the planes of said layers, an inner laminate zone within said bore also having alternating layers of elastomer and stiffening members, the planes of each of which being, in use, substantially parallel to each other and to said pair of end plates, said inner laminate zone itself having a central core of plastically deformable material, said stiffening members of said inner zone extending sufficiently far outwardly to overlap with the inward edges of the stiffening members of said outer zone.

Preferably said laminate has a regular geometric cross-section.

In one embodiment said laminate is substantially circular.

In another embodiment said inner zone is circular and said outer zone is square.

Preferably said stiffening members are rigid plates.

Preferably said elastomer is rubber.

Preferably said laminate has means in/or adjacent to said inner laminate zone for attaching said end plates to said laminate.

In another embodiment the invention may be said broadly to consist in a laminate for use between a pair of end plates in a seismic isolating bearing comprising:

an outer laminate zone having alternating layers of elastomer and stiffening members, the planes of each said layer being, in use, substantially parallel to each other and to said pair of end plates, a bore extending substantially through said laminate having a central axis orthogonal to the planes of said layers, an inner laminate zone within said bore also having alternating layers of elastomer and stiffening members, the planes of each of which being, in use, substantially parallel to each other and to said pair of end plates, said inner laminate zone itself having a central core of plastically deformable material, said laminate having means in or adjacent to said inner laminate zone for attaching said end plates to said laminate.

Preferably said laminate has a regular geometric cross-section.

In one embodiment said laminate is substantially circular.

In another embodiment said inner zone is circular and said outer zone is square.

Preferably said stiffening members are rigid plates.

Preferably said elastomer is rubber.

In one embodiment said stiffening members extend outwardly from said core of plastically deformable material but stop short of the boundary between said inner and said outer laminate zones.

In another embodiment the invention may be said broadly to consist in the combination of a pair of end plates with a laminate immediately described herein above.

Preferably in said combination said end plates are attached to said laminate in the vicinity of the centres of said end plates and said inner laminate zone.

In another embodiment the invention may be said broadly to consist in a connector for making a once only connection between two members comprising:

a male connector member having a cylindrical end portion with a substantially flat end face, an annular recess in said end portion adjacent to said end face and a channel open at its radial side and axial end having a radial depth substantially the same as the radial depth of said recess and a width along its radial side at least as wide as the width in an axial direction of said annular recess extending substantially spirally from said end face into said annular recess, and a female connector member having a plate like portion of thickness to fit within said annular recess, a circular bore through said plate like portion with a diameter slightly greater than the diameter of the bottom of said axial recess in said first connector member, a guiding member in said female connector member comprising a portion of the outer periphery of said circular bore cut radially outwardly and bent axially away from a cross-sectional plane of said bore at an angle substantially the same as that of the spiral path of said channel in said male connector member, whereby when said flat end of said cylindrical portion of said male connector member is pressed against the periphery of said bore of said female connector member with said guiding member directed into said channel of said male connector member and said male connector member is rotated while still being pressed against said female connector member, said guiding member rides up said channel into said axial recess and is straightened thereby and is followed by the remainder of the periphery of said bore so that, after one complete revolution of said male connector member, said connector members are permanently joined with the periphery of said bore being within said annular recess.

Preferably said male connector member is a threadless bolt which is suitable for passing through a bore through the centre of an end plate in an energy absorbing bearing as hereindefined and said female connector member is a stiffening member in a laminate in a said bearing closest to an end plate.

In another embodiment said male member has two said channels into said recess which are open at their radial sides and axial ends and said female member has two said guiding members, said channel axial ends and said guiding members being in registry with one another when said male member is placed against said female member.

In a still further embodiment there are three or more said channels in said male member and a corresponding number of guiding members in said female member.

Preferably when there is more than one said channel in said guiding member each channel is symmetrically disposed about its respective male and female members.

In a still further embodiment the invention may be said broadly to consist in an energy absorbing bearing comprising:

top and bottom end plates, a substantially integral laminate comprising alternating layers of resilient material and stiffening members interposed between said plates, said bottom end plate being connected to said laminate at or adjacent to a central axis running from one said end plate through said laminate to the other said plate but not otherwise, said top end plate not being secured to said laminate but constrained by guiding means from moving horizontally relative to said laminate while being capable of reciprocal vertical movement relative to said laminate, the unconnected adjacent surface portions of said laminate being capable of limited movement relative to each said end plate when said bearing is being acted upon by an external force.

In one alternative said guiding means comprises an upright pin secured in said laminate and projecting upwardly beyond the thickness of said upper plate and a bore through said upper plate, the pin fitting loosely in said bore so that said upper plate can move reciprocally vertically relative to said laminate.

In another alternative said pin is secured to said upper plate projecting downwardly and the loosely fitting bore is in said laminate.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

BRIEF DESCRIPTION OF THE DRAWINGS

A bearing according to the invention in which the end plate are secured to the laminate near its centre will be referred to herein as a "centrally driven bearing" and the connection as a "centre drive".

Preferred forms of the present invention will now be described with reference to the accompanying drawings in which.

MODES OF CARRYING OUT THE INVENTION

FIRST EMBODIMENT

Figure 1:
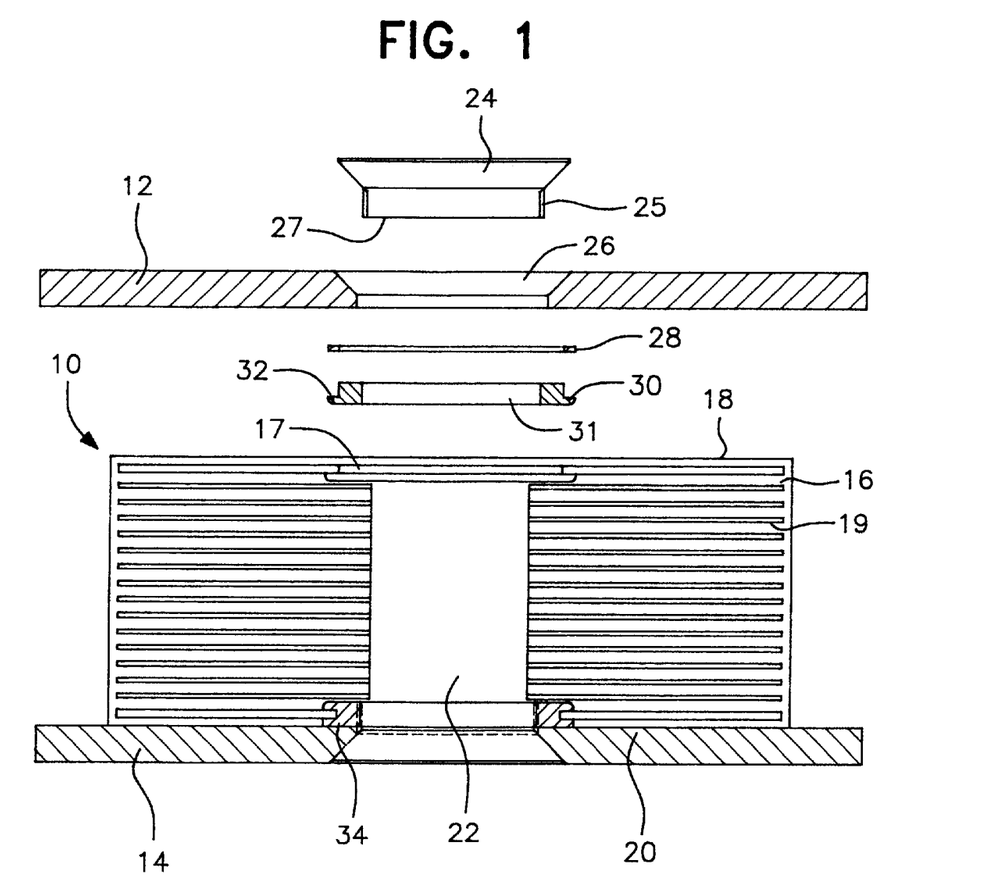
FIG. 1 is a partly exploded view of a centrally driven bearing according to the invention.

FIG. 1 illustrates a first embodiment of the invention. The bearing 10 has a pair of end plates 12 and 14. End plate 14 would normally be fixed to a foundation portion of a structure and upper plate 12 under the structure being isolated, for example for seismic purposes. Between the end plates 12 and 14 there is a laminate comprising a stack of steel plates 18, 19 and 20 embedded in an elastomer 16 preferably of rubber. In the embodiment illustrated plates 18 and 19 at the top and bottom of the laminate are of a slightly greater thickness than intermediate plates 19.

Plates 18, 19 and 20 can be of the same thickness or different thickness and of the same or different grades of materials. A preferred material for the plates is steel. The steel may be of mild steel through to soft Swedish steel, high tensile or even pure iron. Where the damping is to be done primarily by the plates and the laminate does not contain a plastically deformable core, the plates should have a high plasticity once deformation has progressed beyond the elasticity range. As will be seen with reference to FIGS. 10 and 12 the reinforcing plates in centrally driven bearings are able to play a much greater role in damping than their counterparts (FIGS. 9 and 11) in prior art bearings.

In the centre of the laminate is an insert 22 of plastically deformable material, preferably lead. Within the laminate are a pair of nuts 30 having threaded bores 31. Each nut 30 has a circumferential lip 32. There is a bore 17 through upper plate 18 and the inward edge of annular plate 18 rests on the top of lip 32. A collar 28 is press fitted into place on the upper face of plate 18. A corresponding collar at the bottom of the bearing defines an annular slot 34 securing the inner edge of plate 20 in the same manner.

The bore 26 through the centre of upper plate 12 is shaped to allow fixing bolt 24 having a threaded cylindrical portion 25 to pass therethrough. Bolt 24 is then threaded into nut 30 to fix upper plate 12 into position. The bottom face 27 of bolt 24 is pressed against the upper face of insert 22. In a preferred embodiment there is a rubber layer adhered to face 27.

In an alternative construction the upper plate may have a threaded bore instead of nut 30 into which bolt 24 is threaded.

When the structure is assembled as shown there is no connection between the upper face of plate 14 and the bottom face of the elastomer 16 and the lower face of end plate 12 and the upper face of the laminate elastomer 16 other than by the bolts 24 and nuts 30. This is the centre drive. When a structure is resting on end plate 12 these faces will usually be in contact, but the laminate will be able to move relative to the end plates as described below.

The embodiment described has a plastically deformable insert 22, preferably lead. Another embodiment of a centrally driven bearing has an empty core (containing air or an insert gas or possibly a vacuum) surrounded by a laminate of elastomer 16 and plates 18, 19 and 20.

Figure 12:
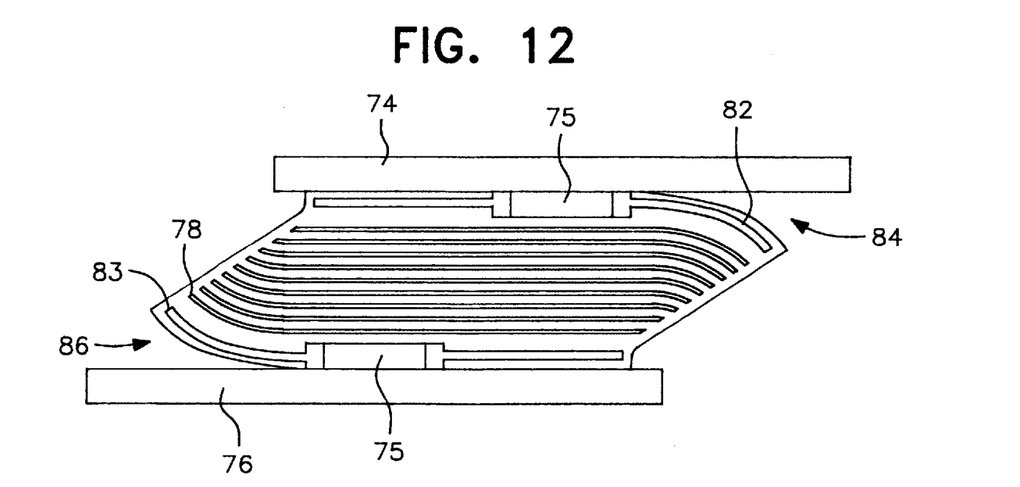
FIG. 12 is a schematic sectional elevation of another centrally driven bearing according to the invention where one end plate has been displaced laterally in relation to the other.

In another embodiment shown schematically in FIG. 12 there is no insert or hollow core, but just a laminate between the end plates 12 and 14.

To assemble the structure illustrated in FIG. 1, alternating layers of rubber 16 and steel plates 20, 19 and 18 with the nuts 30 already installed are press fitted together. The bottom plate 14 is bolted into position. The lead insert 22 is then inserted and the upper plate bolted 12 in position. The rubber 16 is then volcanised into the laminate illustrated in FIG. 1.

In one embodiment the top more reinforcing plate 18 and the bottom most plate 20 are not volcanised within elastomer 16.

As is known in the art it is possible to have more than one insert 22 in the laminate. Preferably when there is more than one insert 22 the inserts are symmetrically displaced throughout the laminate. The inserts may be entirely encased in elastomer.

FIGS. 2a to 2g illustrate alternative plates which may be used both as end plates 12 or 14 or as the top or bottom plates 18 and 20 in the laminate. Each of the plates 12 has built into it means which allow some flexibility in the direction of the central axis of the bearing. This would normally be the vertical direction when a bearing is installed.

Figure 2A:
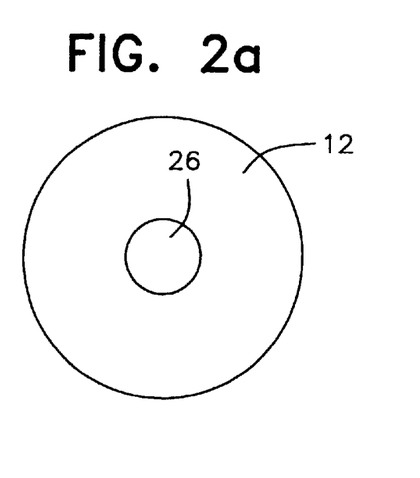
FIGS. 2a–2g are plan views of end plates and/or stiffening plates incorporating means to give them reciprocal flexibility in the direction of their central axes.
Figure 2B:
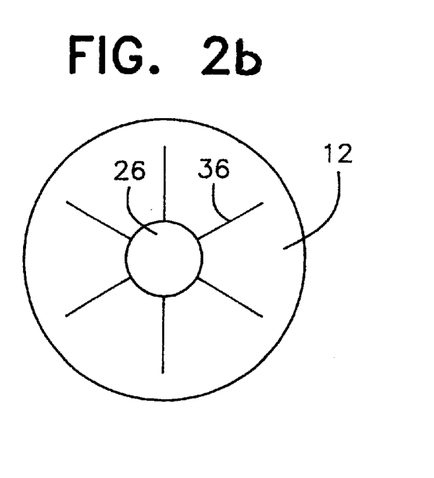
Figure 2C:
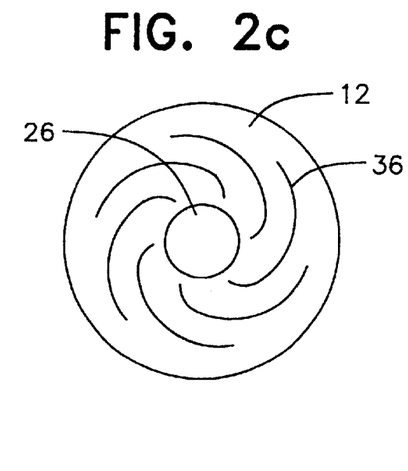
Figure 2D:
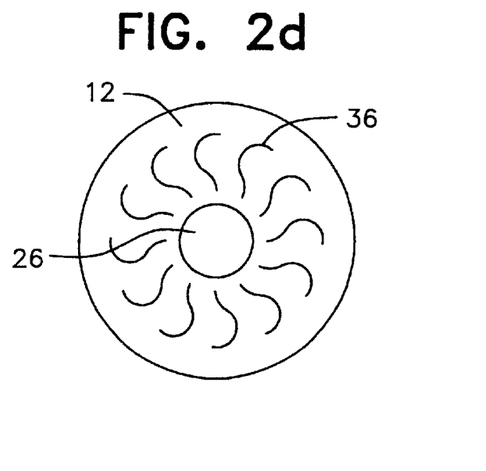
Figure 2E:
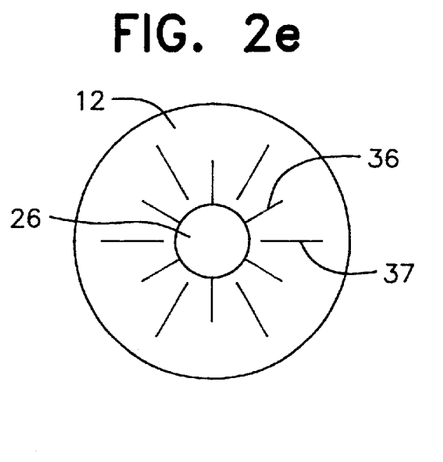
Figure 2F:
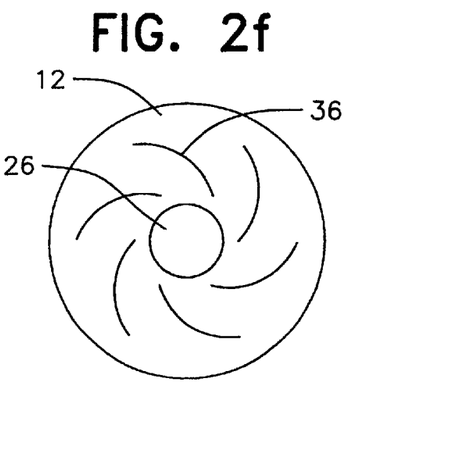
Figure 2G:
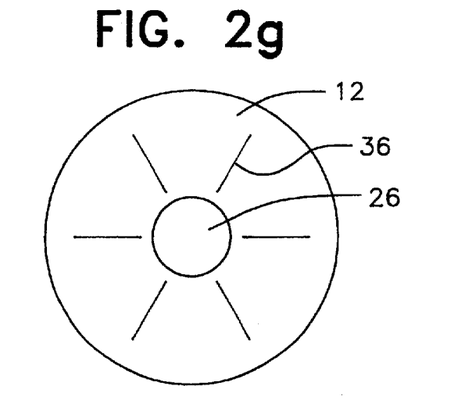

In each of FIGS. 2a to 2g there is illustrated a plate 12 having a central bore 26. In FIG. 2a, the thickness of the plate 12, or the material from which it is made, have some flexibility so that after the initial elasticity of the plate allows vertical movement the plasticity of the plate dumps the vertical shocks or displacements. In each of FIGS. 2b to 2g there are scorings or slots 36 and 37 in the plates 12 to provide flexibility for the same purpose. The scorings or slots can extend part way or the whole way through the thickness of the plate 12. In each case the plates 12 are both elastically and plastically deformable. The balance can be chosen by the appropriate choice of material.

Figure 3:
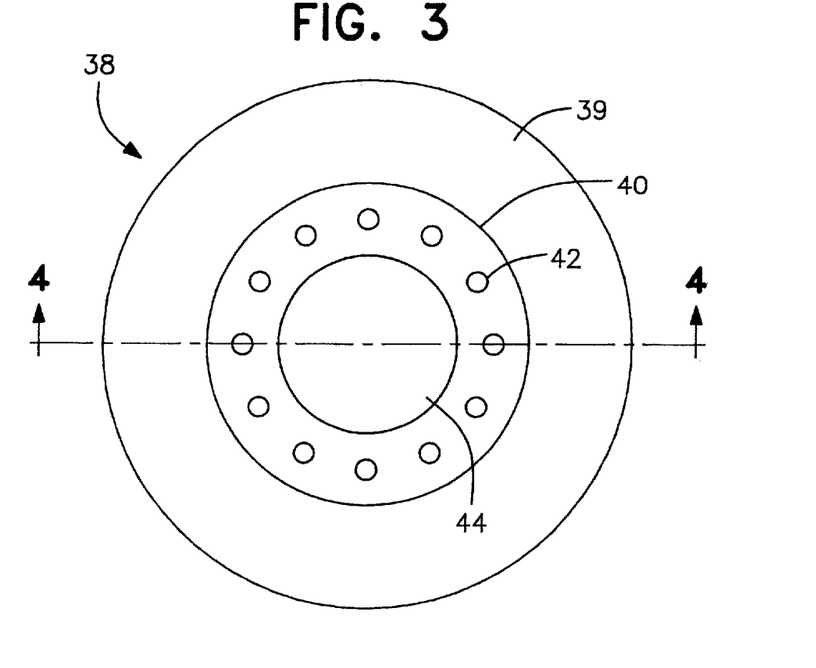
FIG. 3 is a plan view of an alternative embodiment of an end plate according to the invention.
Figure 4:
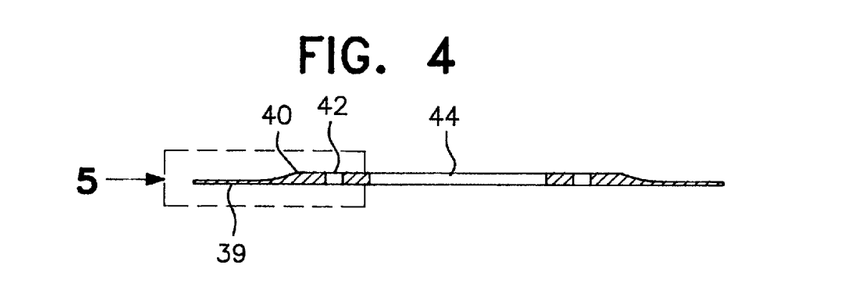
FIG. 4 is the sectional view IV—IV shown in FIG. 3.
Figure 5:
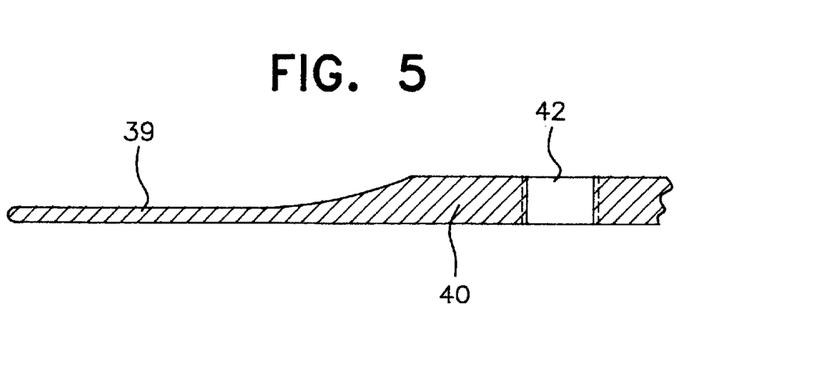
FIG. 5 is the detail shown by arrow⑤ in FIG. 4.

FIGS. 3–5 illustrate a further alternative end plate 38. Plate 38 has a central bore 44, a shoulder portion 40 radially outward from the bore 44 and a lip portion 39 radially outward from shoulder portion 40. Spaced symmetrically around the bore through the shoulder portion 40 are a series of bolt holes 42. In this embodiment of the invention the upper plate 38 is fixed to the top plate 18 of the inner laminate by a series of bolts passing through bolt holes 42 into corresponding threaded holes in top plate 18.

The purpose of bore 44 is to allow the placement of an insert 22 into a hole in a laminate. A top laminate plate 18 which did not have a central bore would be placed between the end plate 38 and the end of insert 22 in such a construction. In another embodiment plate 38 does not have a central bore and the centre has the same thickness as shoulder portion 40.

Figure 6:
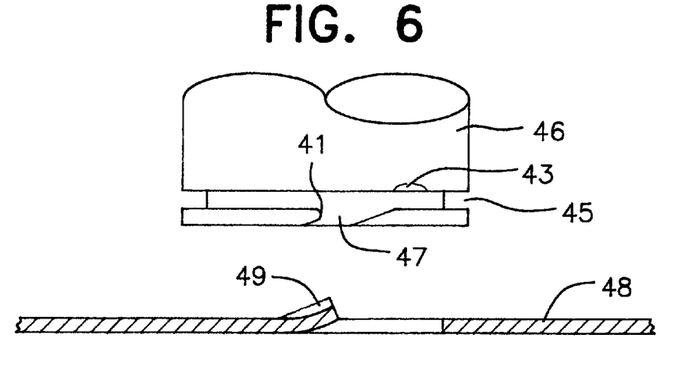
FIG. 6 is a fragmentary sectional exploded view of a once only connector securing an end plate to a stiffening plate in a laminate. The bottom part of FIG. 6 is the sectional view VI—VI in FIG. 7.
Figure 7:
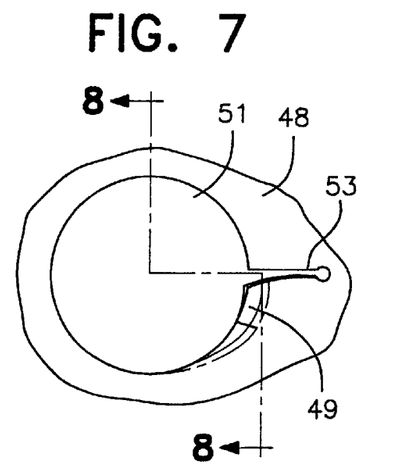
FIG. 7 is a top plan view of an outermost stiffening plate in a laminate adapted to receive a connecting bolt.
Figure 8:
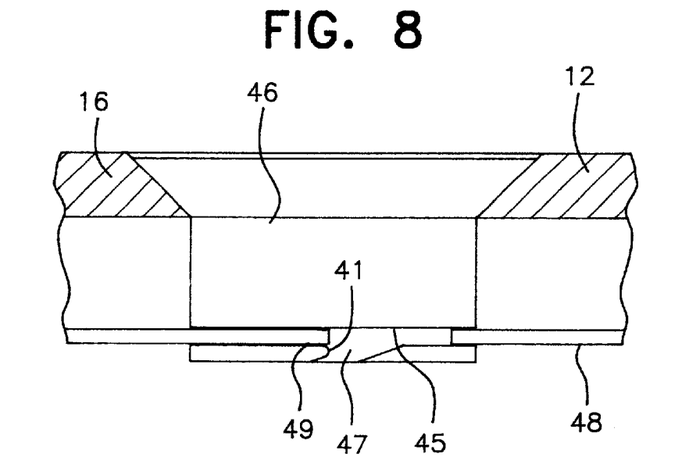
FIG. 8 is a schematic sectional view of the connector of FIGS. 6 and 7 securing an end plate to a stiffening plate within a laminate.

There is shown in FIGS. 6 to 8 an alternative connecting means to nut 30 and bolt 24 for securing the centre of each of the end plates 12 and 14 to the laminate. There are two components. The male component is a bolt 46. Bolt 46 may be solid or hollow. It may be in the form of a stud or a pin. The female component is steel plate 48 which is a part of the laminate imbedded in elastomer 16 in the position of steel plates 18 and 20 shown in FIG. 1. Toward the flat end of bolt 46 is an annular recess 45. The axial width of that recess 45 is greater than the thickness of plate 48. There is a channel 47 which has the same radial depth as recess 45 and which is open on its outer radial periphery and runs substantially spirally from the flat end of bolt 46 into the annular recess 45. Steel plate 48 has a circular bore 51 cut therethrough. The diameter of bore 51 is slightly greater than the diameter of the bottom of annular recess 45. A radial cut 53 is made out of bore 51 and a tongue like guiding member 49 cut as a part of a circle and raised to the angle illustrated in FIG. 6.

The axial thickness of recess 45 may be up to twice the thickness of plate 48. Where the axial thickness of recess 45 is close to that of plate 48 a groove 43 (shown in ghost) may be provided in the axial top of recess 45 in the line of travel from channel 47 to allow for an easier connection as will be explained below. The trailing upper lip 41 of channel 47 is preferably rounded off.

To assemble the two connecting members, bolt 46 is pressed against plate 48 with the tongue 49 aligned with the bottom opening of channel 47. The bolt 46 is then rotated in a clockwise direction and guiding member 49 rides up through channel 47 and begins to be straightened into recess 45. Where the axial thickness of recess 45 is close to that of plate 48 and therefore guiding member 49 the guiding member is able to ride up into groove 43 as it enters recess 45. Plate 48 is slightly distorted as the rotation continues and tongue 49 is fully straightened in recess 45. When a complete rotation is completed the peripheral edge of bore 51 rests within annular recess 45 in a permanent connection. The purpose of rounding off lip 41 of channel 47 is to preclude the possibility of the opposite side of cut 53 from member 49 catching on a sharp point and being wedged into channel 47 and thus able to undo the connection if bolt 46 is rotated in an anti-clockwise direction.

Figure 7A:
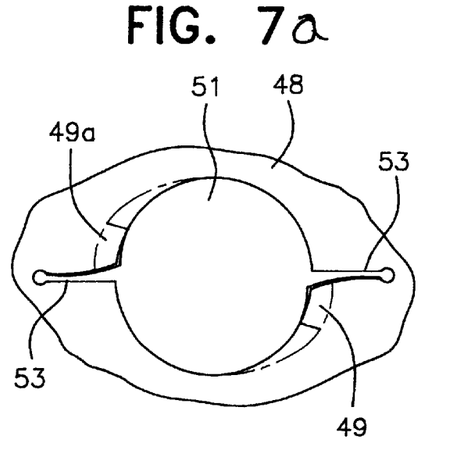
FIG. 7a is a top plan view of another embodiment of the plate shown in FIG. 7.

In another embodiment (conveniently called the "two start" connector) shown in FIG. 7a there are two guiding members 49 and 49a on opposite sides of bore 51. There is a second channel of the same configuration as channel 47 in FIG. 6. In the two start embodiment guiding members 49 and 49a enter recess 45 as bolt 46 is rotated in a clockwise direction. Connection is complete after one half a rotation.

Three or more start embodiments could also be used.

This connector can be used for other purposes apart from fitting end plates to laminates as shown here.

although the construction has been described in relation to a bearing having an insert of plastically deformable material it is possible for the laminate of elastomer 16 and stiffening plates 18, 19 and 20 to extend across the entire laminate without any core for some applications. Such a bearing would be identical to that illustrated in FIG. 1 except that there would be no insert 22.

In another alternative where greater flexibility is designed the insert 22 would only contain air.

The bearing 10 as illustrated is circular in cross-section. The laminate can be square or rectangular with cylindrical cores. The cores can also be of other geometric shapes as illustrated in earlier patent specifications referred to above.

Alternative plastically deformable materials to lead are also described in the same references.

In operation, because of the separation between the bottom and top faces of elastomer 16 and the bottom and top faces of end plates 12 and 14 respectively except for the central connection of nut 30 and bolt 24 there is an ability to provide damping for incoming forces of a wide band of magnitude.

Figure 9:
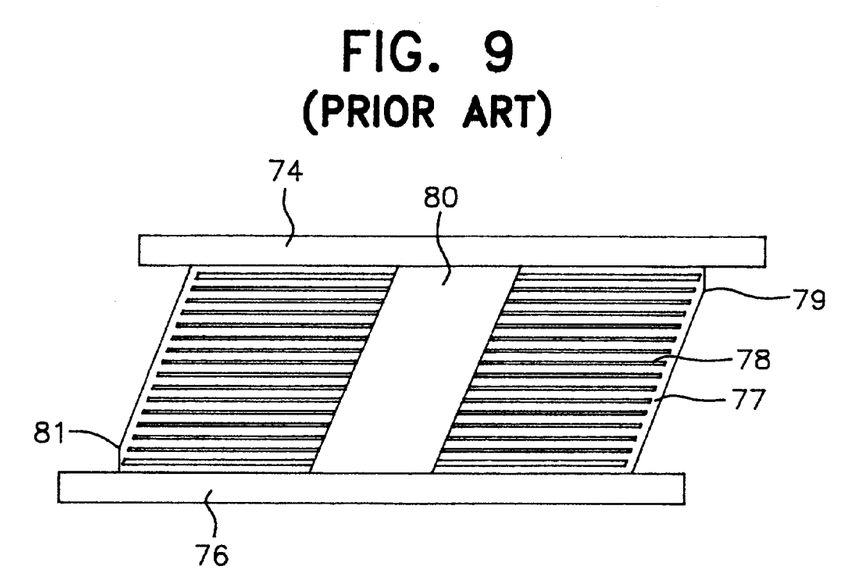
FIG. 9 is a schematic elevational view of a prior art bearing with a plastically deformable insert in which the laminate and the end plates are secured to one another out to their peripheries, where one end plate has been displaced laterally in relation to the other.

In FIG. 9 there is shown a conventional seismic isolation bearing of the kind described in U.S. Pat. No. 4,117,637. When such a bearing is in position and is subjected to external cyclic shear forces such as are experienced during an earthquake the top 74 and bottom 76 end plates are horizontally displaced from one another in the manner illustrated in FIG. 9. In the bearing shown the laminate consists of steel plates 78 and of an elastomer 77 with a lead insert 80. The end plates 74 and 76 are secured to the laminate in a conventional manner across the entire interface using bolts or other conventional securing mechanisms as described in the prior art. As the plates approach their maximum displacement from one another there are two areas of strain 79 and 81 in which the laminate is being stretched to the limit of the materials because it cannot pull away from the end plates 74 and 76. In a severe earthquake the fixing means can be pulled free of the laminate and the bearings will need to be repaired or replaced. If this happens in a large building the costs of removing the bearings for this can be substantial.

Figure 10:
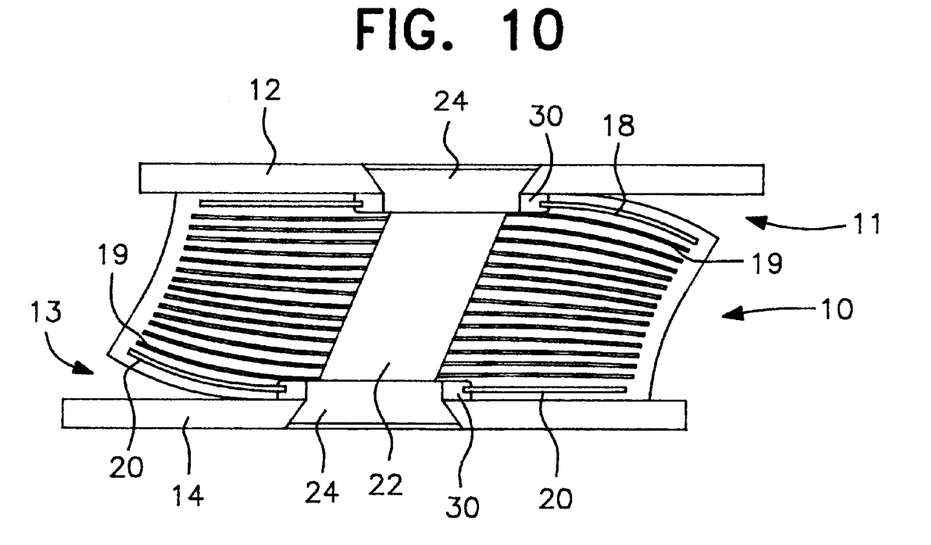
FIG. 10 is a schematic sectional view of a centrally driven bearing with a plastically deformable insert according to this invention, where one end plate has been displaced laterally in relation to the other.

In FIG. 10 there is illustrated a bearing as shown in FIG. 1 in which the end plates 12 and 14 have been horizontally displaced relative to one another by cyclic shear forces. In this case, because the connection between the end plates 12 and 14 is at their centres through the nut and bolt mechanisms 24 and 30 described in relation to FIG. 1, the laminates are able to pull away from the upper and lower plates respectively to leave separation gaps 11 and 13 respectively. When the plates 12 and 14 return to their normal rest positions the laminate returns to its original position as shown in FIG. 1 without damage to it.

An additional benefit is also illustrated in relation to FIG. 10. All the stiffening plates 18, 19 and 20 are able to bend and thereby provide supplementary damping to that provided by insert 22. The plates nearest to gaps 11 and 13 provide the most damping. Where plates 18 and 20 are not vulcanised in the remainder of the laminate they will pull away or fan out from the remainder of the laminate to further relieve the delamination strains encountered at areas 79 and 81 by the conventional bearing in FIG. 9.

Figure 11:
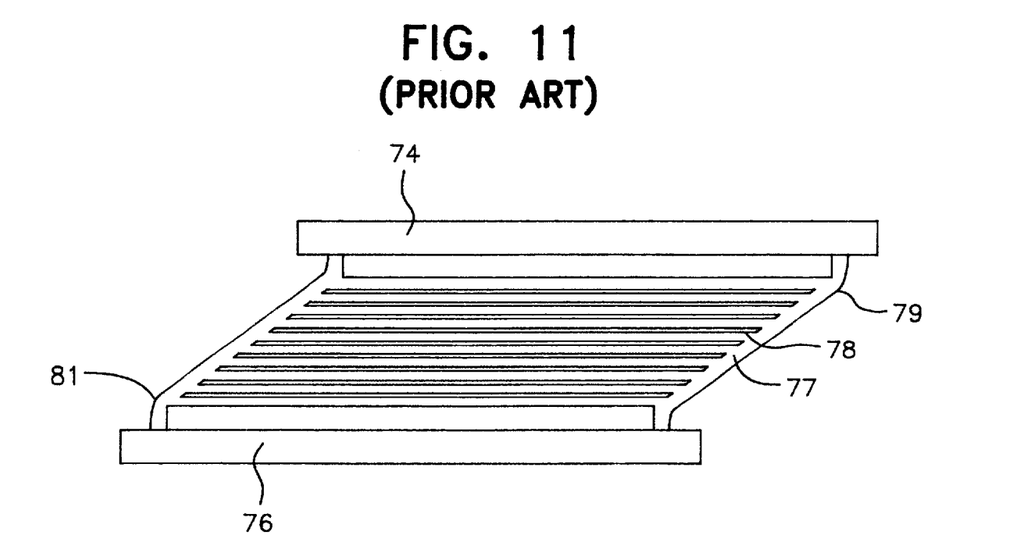
FIG. 11 is a schematic side elevation sectional view of a prior art seismic isolating bearing without a plastically deformable insert where the end plates are secured to the laminate out to their peripheries, where one end plate has been displaced laterally in relation to the other.

In FIG. 11 there is shown an elastomer bearing with stiffening members 78 but without a plastically deformable insert. The bearing comprises end plates 74 and 76 and a laminate having an elastomer 77 and steel plates 78. End plates 74 and 76 are fixed to the laminate across the entire face thereof out to the periphery. At the point of maximum horizontal displacement of end plates 74 and 76 from one another there are created areas of maximum strain 79 and 81 in which the laminate can be ripped away from the end plates 74 and 76 with the same adverse consequences as was described in relation to the prior art embodiment illustrated in FIG. 9.

In the embodiment illustrated in FIG. 12 end plates 74 and 76 are fixed to the laminate by a central drive connection 75. They are not otherwise connected to the top and bottom of the laminate. In a similar manner to that illustrated in relation to FIG. 10 the laminate can pull away from the end plates to create gaps 84 and 86. In the absence of any insert, steel plates 78, 82 and 83 provide substantially all of the damping by being bent during displacement and straightening when the end plates return to a rest position. As with the plates 18, 19 and 20 the plates 78, 82 and 83 are selected for greater or lesser plasticity depending on the forces the bearing is intended to damp. When plates 82 and 83 are not vulcanised to the remainder of the laminate they will fan out from in gaps 84 and 86.

An advantage of centrally driven bearings according to the invention is that they are able to absorb a greater amount of energy with the same amount of material because of the extra damping provided by bending of the stiffening plates. This means that if only the same amount of damping as in a conventional bearing were desired the height of an equivalent centrally driven bearing could be less thus reducing costs.

The most common direction of forces encountered in earthquakes is horizontal. Occasionally there can be vertical forces when, for example, ground on one side of a fault line rises or falls relative to ground on the other. The central attachment of end plates to laminate in combination with plates having flexibility in use in the vertical direction illustrated in FIGS. 2 to 5 will help damp such forces and reduce damage to the bearings themselves.

Referring to FIGS. 10 and 12 in preferred embodiments each of end plates 12, 14, 74 and 76 and each of laminate steel plates 18, 20, 82 and 83 are constructed as one of the embodiments of FIGS. 2 to 5. When such a bearing and a structure resting on it is subjected to a vertical force the parts of the interfaces between the end plates and the laminate are able to separate from one another. At the same time because of the flexiblity in the end plates 12, 14, 74 and 76 and steel plates 18, 20, 82 and 83 they are able to move vertically upwardly or downwardly slightly distorting the elastomer in the laminate. The deformation of the plates at the same time provides damping of the vertical forces.

It will be appreciated that the horizontal and vertical forces will usually be experienced at the same time and the shape of the bearings distorted somewhat asymmetrically while this is happening.

SECOND EMBODIMENT

Figure 13:
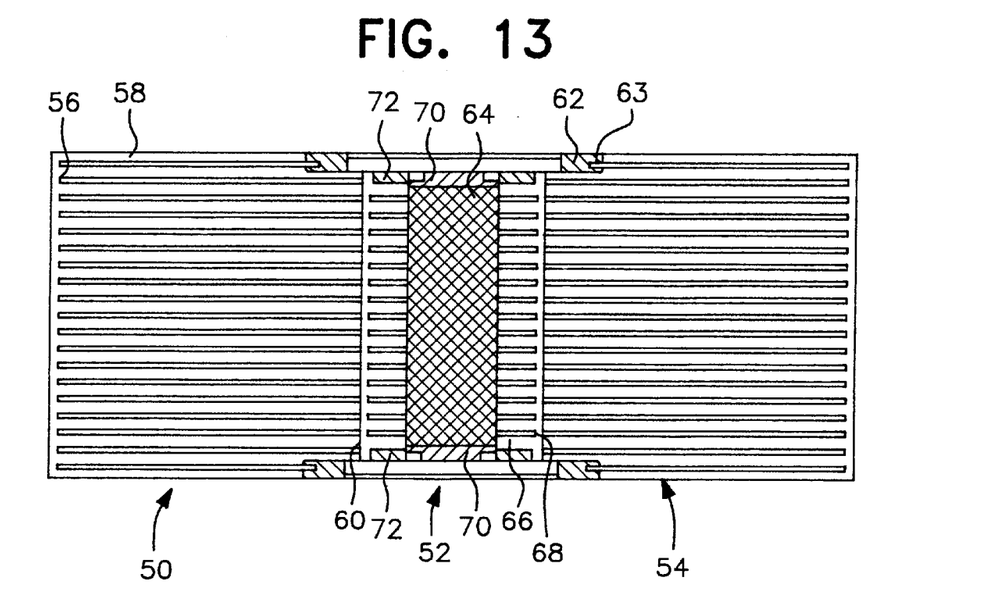
FIG. 13 is a cross-section of another embodiment of a laminate according to the invention for use in a seismic isolating bearing.

A second embodiment of the invention is illustrated in FIG. 13. In this case, the invention is a laminate 50 for use between a pair of end plates such as end plates 12 and 14 illustrated in FIG. 1. In the embodiment shown the bearing has a centre drive. In an alternative embodiment the end plates and laminate may be secured as in prior art bearings.

The laminate consists of an inner zone 52 and an outer zone 54 which is arranged concentrically around it. The cross-section of the laminate 50 can be any regular geometric shape. For simplicity the invention will be described with reference to a laminate having a circular cross-section and whose inner zone 52 is also circular in cross-section. The outer zone 54 of the laminate consists of a alternating layers of elastomer 56, preferably rubber, and reinforcing members, such as steel plates 58. The laminate is formed in the same way as described above in relation to the first embodiment shown in FIG. 1. At either end of the outer zone 54 of the laminate 50 is a nut 62 and press fit collar 63 which are identical in construction and operation to nut 30 described with reference to FIG. 1. The inner zone 52 has an insert 64 of plastically deformable material, preferably lead. This insert is surrounded by alternating layers of elastomer 66 and annular steel plates 68. In this embodiment the boundary 60 between the inner zone 52 and the outer zone 54 is defined by the outer cylindrical surface of elastomer 66 and the inner cylindrical surfaces of elastomer layers 56 and steel plates 58.

At either end of insert 64 there is a cap 70 which is held in place by a collar 72. When the laminate 50 is to be assembled with end plates 12 and 14, fixing bolts 24 as illustrated in FIG. 1 are screwed into nuts 62. Preferably there is a layer of elastomer provided on the bottom face 27 of each bolt 24 when this is done separating cap 70 and collar 72 from the bottom face 27 of bolt 24.

The embodiment of FIG. 13 is shown very schematically in FIGS. 15–19. The laminate has an outer zone 88 completely surrounding an inner zone 91 having an insert 90 which itself is surrounded with elastomer 92. In the schematic diagram the stiffening plates are not shown. It will be seen that there is elastomer 92 both above and below the insert 90. In a bearing in which the laminate was installed there would be an end plate immediately above and below both outer and inner laminate zones 88 and 91.

Figure 16:
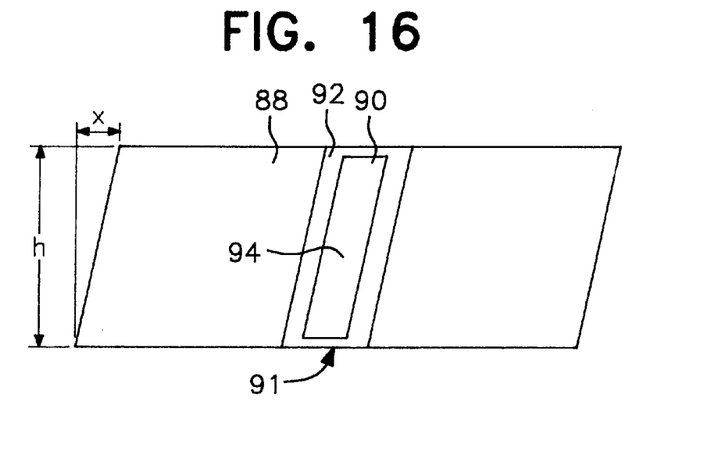
FIG. 16 is the embodiment illustrated in FIG. 15 displaced horizontally a distance of 20% of the height of the laminate.
Figure 17:
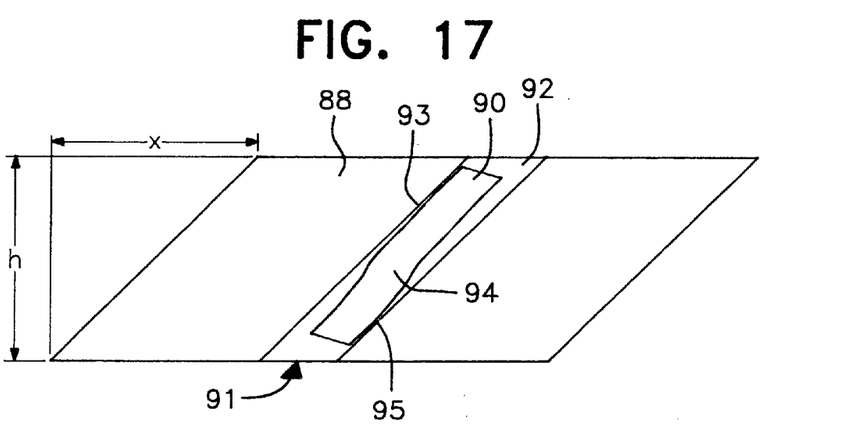
FIG. 17 is the embodiment of FIG. 15 displaced horizontally a distance of 100% of the height of the laminate.
Figure 18:
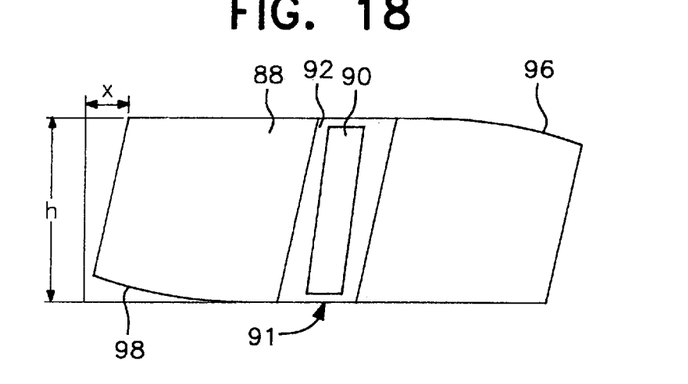
FIG. 18 is a laminate of the type illustrated in FIG. 13 which is centrally driven. The embodiment shown in FIG. 18 has been displaced horizontally 20% of the height of the bearing.
Figure 19:
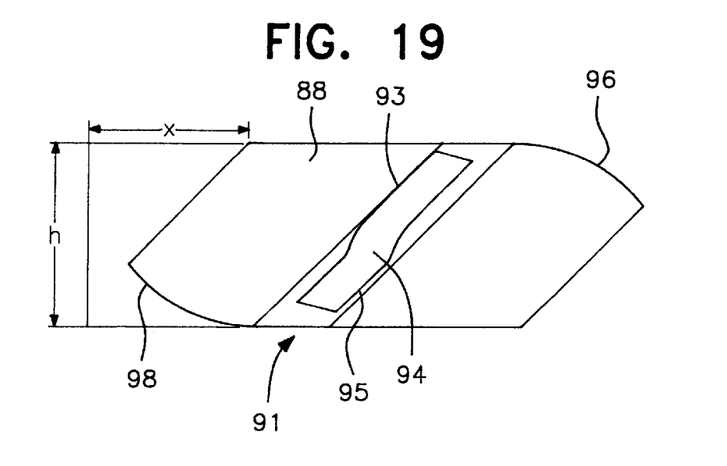
FIG. 19 is a view of the embodiment illustrated in FIG. 18 but displaced horizontally 100% of the height of the laminate.

In the embodiment of FIGS. 16 and 17 the laminate is secured to the end plates across substantially the whole of its interface with the end plates. In the embodiment of FIGS. 18 and 19 the laminate is centrally driven. The difference in the way in which the two laminates operate is evident.

Referring to FIG. 16 there is illustrated a horizontal displacement (x) to the right which is equivalent to approximately 20% of the height (h) of the bearing. As this displacement occurs insert 90 pivots about a central horizontal axis 94 and elastomer in the top left and bottom right are elastically deformed. The insert 90 undergoes rigid body rotation about axis 94 but with very little plastic deformation. The inner zone 91 contributes little or no damping.

In the embodiment shown in FIG. 17 the top of the laminate 88 has been displaced to the right for distance (x) approximately 100% of the height (h) of the bearing. It will be seen that the elastomer in areas 93 and 95 is grossly deformed and there is some plastic deformation of the insert 90.

The centrally driven embodiment illustrated in FIGS. 18 and 19 performs much in the same manner as that in FIGS. 16 and 17 except that at areas 96 and 98 the laminate 88 is not bound to the end plates and pulls away from the end plates to allow for plastic deformation of reinforcing plates within the laminate 88 as described above with reference to FIGS. 10 and 12.

The advantage of the embodiment of FIG. 13 is illustrated by the above description of FIGS. 15–19. At limited displacements the energy absorbing insert 90 is not plastically deformed. When maximum displacements do occur, the plastic deformation is able to extend to absorb a wider range of forces.

THIRD EMBODIMENT

Figure 14:
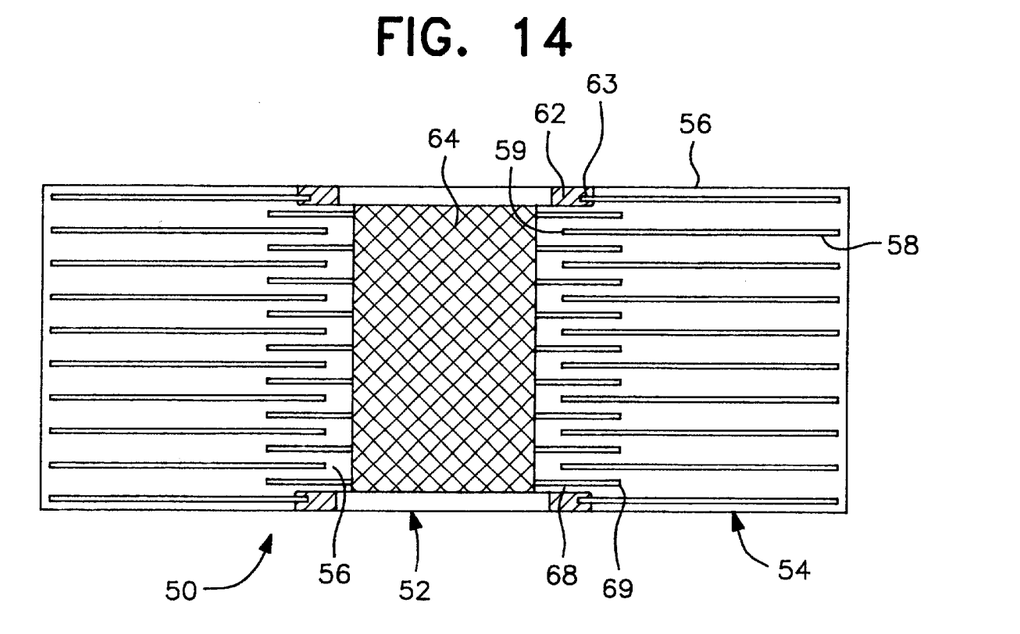
FIG. 14 is a cross-sectional view of an alternative laminate to that shown in FIG. 15.
Figure 15:
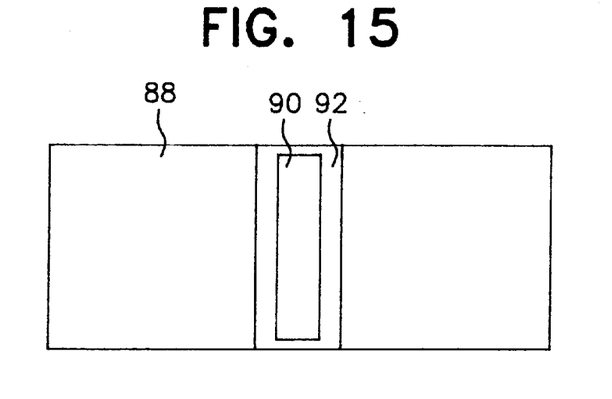
FIG. 15 is a schematic cross-sectional view of a laminate as described in FIG. 13 at rest.

In FIG. 14 there is shown a second embodiment of a laminate similar to that shown in FIG. 13. The laminate 50 in FIG. 10 also has an inner zone 52 surrounded by an outer zone 54. The outer zone 54 consists of alternating layers of stiffening members 58, preferably steel plates, and elastomer 56, preferably rubber. At either end of the outer zone 54 there is provided a nut 62 held over the inner edge of upper most steel plate 58 by a press fit collar 63. The inner zone 52 has an insert 64 of plastically deformable material, preferably lead.

The difference in this embodiment from that in FIG. 13 is that there is no clearly defined boundary between the outer zone and the inner zone. The elastomer 56 is shared between the inner and outer zones. However, the steel plates 68 of the inner laminate zone have a sufficient diameter that their outer edges 69 extend outwardly beyond the inner edges 59 of plates 58 of the outer laminate zone 54. The annular cylindrical area of overlap between edges 59 and 69 roughly defines the boundary between the inner and the outer zone.

The laminates described in FIGS. 13 and 14 may be secured to end plates 12 and 14 at their centres or in a conventional manner or centrally driven. When they are centrally driven they enjoy all of the advantages described with reference to the operation illustrated in FIGS. 10 and 12.

The laminate illustrated in FIG. 14 would in motion behave in much the same way as that in FIG. 13 as illustrated with reference to FIGS. 16 to 19. However, because of the overlap between reinforcing plates extending outwardly from the inner zone and inwardly from the outer zone the bearing would be slightly more rigid than that illustrated in FIG. 13.

Figure 20:
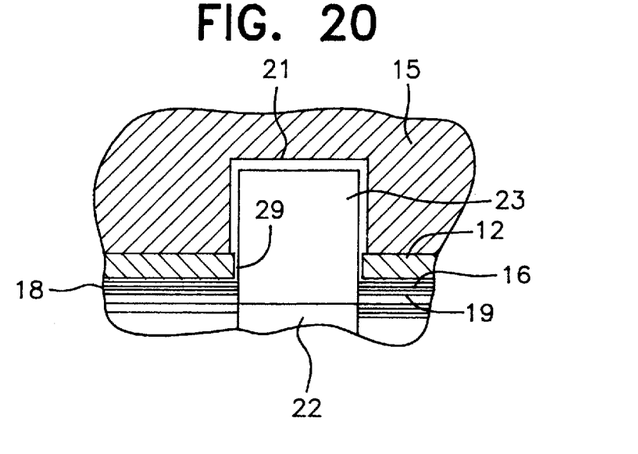
FIG. 20 is a schematic fragmentary cross-sectional view of an embodiment of a centrally driven bearing in which the top plate is not secured to the laminate.

The embodiment illustrated in FIG. 20 is the top connecting part of a bearing according to the invention with a structure 15 resting on the upper end plate 12. As in the embodiment shown in FIG. 1 below upper plate 12 there is a laminate consisting of stiffening plates 18 and 19 embedded within an elastomer 16. There is a central insert 22. Rather than having a nut and bolt connecting the upper plate 12 with the laminate to provide a central drive there instead is a bore 29 through the centre of end plate 12. A pin 23 having a smaller cross-section than bore 29 to allow loose fit is secured against the end of insert 22 within the laminate. When the bearing is assembled the upper plate 12 has its bore 29 aligned with pin 23 and is slid down into place. A structure 15 resting on upper plate 12 has a recess 21 to accommodate pin 23.

In the event of vertical shocks during an earthquake upper end plate 12 can ride up and down pin 23. In such a construction end plate 12 would not provide any damping of vertical forces as would be provided when the embodiments of FIGS. 2a to 2g are employed.

The embodiment of FIG. 20 would dampen horizontal forces in the same manner as is shown in relation to FIG. 10 or 12. Pin 23 would not allow any substantial horizontal movement of end plate 12 relative to the top of the laminate. The weight of the structure 15 on end plate 12 would act to retain plate 12 in place except during vertical shocks. The height of pin 23 would be selected to be higher than any anticipated lifting of end plate 12.

In an alternative embodiment pin 23 would be secured in end plate 12 and be loose fitting in a bore through the centre of the laminate above insert 22. The end plate 12 in such a construction would be able to rise vertically relative to the laminate but would be constrained from horizontal movement by the bore in the laminate in which the lower end of pin 23 would be retained.

REFERENCES

Monti M D, Ferguson W G and Robinson W H (1995)
"LEAD AS A SEISMIC ENERGY DISSIPATOR" *IPENZ Annual Conference* vol 2 p444–p450

Monti M D, Ferguson W G and Robinson W H (1995)
"LEAD AS A CYCLIC MOTION DAMPER" *Pacific Conference on Earthquake Engineering* vol 3 p323–p330

Monti M D and Robinson W H (1996)
"A LEAD-SHEAR DAMPER SUITABLE FOR REDUCING THE MOTION INDUCED BY WIND AND EARTHQUAKE" *Proceedings of* 11*WCEE Mexico City*

Robinson W H (1982)
"LEAD-RUBBER HYSTERETIC BEARINGS SUITABLE FOR PROTECTING STRUCTURES DURING EARTHQUAKES" "*Earthquake Eng. and Str. Dyn* vol 10 p593–p604

Robinson W H and Greenbank L R (1976)

"AN EXTRUSION ENERGY ABSORBER SUITABLE FOR THE PROTECTION OF STRUCTURES DURING AN EARTHQUAKE" *Earthquake Eng. and Str. Cyn* vol 4 p251–p259

Robinson W H (1995)

"SEISMIC ISOLATION, THE NEW ZEALAND EXPERIENCE" *ASME/JSME PVP Conference Hawaii* 1995

Robinson W H (1996)

"RECENT DEVELOPMENTS IN SEISMIC ISOLATION" *Proceedings of* 11*WCEE Mexico City*

Scawthorn C, Kato B and Lu L W (1995)

"CRITERIA AND LOADING" *Fifth World Congress on Habitat and the High-Rise* p839–p1150

Skinner R I and McVerry G H (1975)

"BASE ISOLATION FOR INCREASED EARTHQUAKE RESISTANCE" *Bulletin of the New Zealand Society for Earthquake Engineering* vol 8 No. 2

Skinner R I, Robinson W H and McVerry G H (1993)

"AN INTRODUCTION TO SEISMIC ISOLATION" John Wiley and Sons Ltd, West Sussex, England

What is claimed is:

1. An energy absorbing bearing comprising:
   a pair of end plates,
   a substantially integral laminate comprising alternating layers of resilient material and stiffening members interposed between said end plates,
   each said end plate being connected to the stiffening member in said laminate nearest to said end plate, the connection being at or adjacent to a central axis running from one end plate through said laminate to the other end plate,
   the unconnected adjacent surface portions of said laminate being capable of limited movement relative to each said end plate when said bearing is being acted upon by an external force.

2. A bearing as claimed in claim 1 wherein there is provided an insert of plastically deformable material along said central axis extending substantially from one said end plate to the other said end plate.

3. A bearing as claimed in claim 2 wherein each said insert is compressed at a hydrostatic pressure at least approaching the shear yield stress of said plastically deformable material.

4. A bearing as claimed in claim 2 wherein said insert material is lead.

5. A bearing as claimed in claim 2 wherein said resilient material is rubber.

6. A bearing as claimed in claim 2 wherein said end plates are adapted to have some flexibility in the direction along said central axis.

7. A bearing as claimed in claim 1 wherein said laminate is continuous from side to side and end to end without an insert.

8. A bearing as claimed in claim 1 wherein there is an empty core along said central axis extending substantially from one said plate to the other said plate.

9. A bearing as claimed in claim 1 wherein there are provided a plurality of inserts within said laminate.

10. A method of isolating a structure from seismic forces acting upon it which comprises:
    providing an energy absorbing bearing having a pair of end plates, and a substantially integral laminate of alternating layers of elastomer and stiffening material between said end plates, each of the end plates being secured to the stiffening material in said laminate nearest to said end plate, the securing being only in the area adjacent a central axis passing through said end plates and said laminate,
    resting said structure on one said end plate and resting the other said end plate on the ground or another structure, and
    securing said structure to one said end plate and securing the other said end plate to the ground or to another structure.

11. A connector for making a once only connection between two members comprising:
    a male connector member having a cylindrical end portion with a substantially flat end face, an annular recess in said end portion adjacent to said end face and a channel open at its radial side and axial end having a radial depth substantially the same as the radial depth of said recess and a width along its radial side at least as wide as the width in an axial direction of said annular recess extending substantially spirally from said end face into said annular recess, and
    a female connector member having a plate like portion of thickness to fit within said annular recess, a circular bore through said plate like portion with a diameter slightly greater than the diameter of the bottom of said axial recess in said first connector member,
    a guiding member in said female connector member comprising a portion of the outer periphery of said circular bore cut radially outwardly and bent axially away from a cross-sectional plane of said bore at an angle substantially the same as that of the spiral path of said channel in said male connector member, whereby when said flat end of said cylindrical portion of said male connector member is pressed against the periphery of said bore of said female connector member with said guiding member directed into said channel of said male connector member and said male connector member is rotated while still being pressed against said female connector member, said guiding member rides up said channel into said axial recess and is straightened thereby and is followed by the remainder of the periphery of said bore so that, after one complete revolution of said male connector member, said connector members are permanently joined with the periphery of said bore being within said annular recess.

12. An energy absorbing bearing comprising:
    top and bottom end plates,
    a substantially integral laminate comprising alternating layers of resilient material and stiffening members interposed between said plates,
    said bottom end plae being connected to the stiffening member in said laminate nearest to said bottom end plate, the connection being at or adjacent to a central qxis running from one said end plate through said laminate to the other said,
    said top end plate not being secured to said laminate but constrained by guiding means from moving horizontally relative to said laminate while being capable of reciprocal vertical movement relative to said laminate,
    the unconnected adjacent surface portions of said laminate being capable of limited movement relative to each said end plate when said bearing is being acted upon by an external force.

\* \* \* \* \*